Sept. 18, 1923.
M. LOUGHEAD
BRAKING APPARATUS
Filed July 10, 1922
1,468,600
2 Sheets-Sheet 1
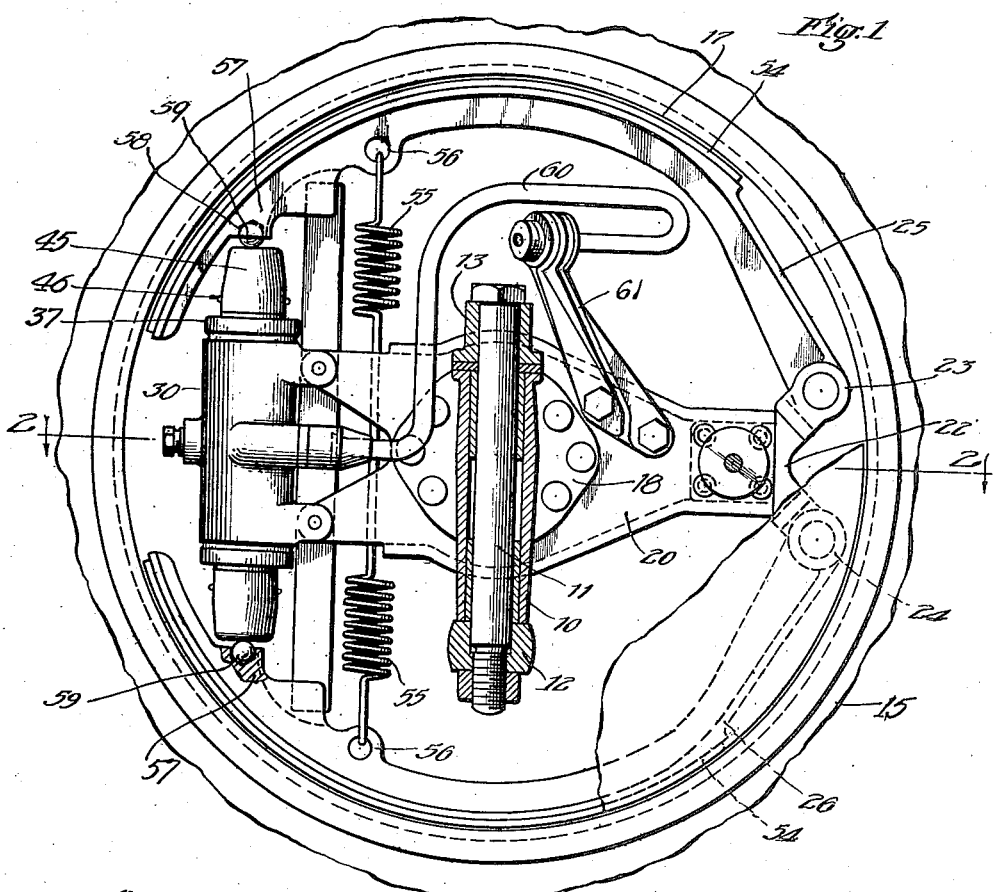
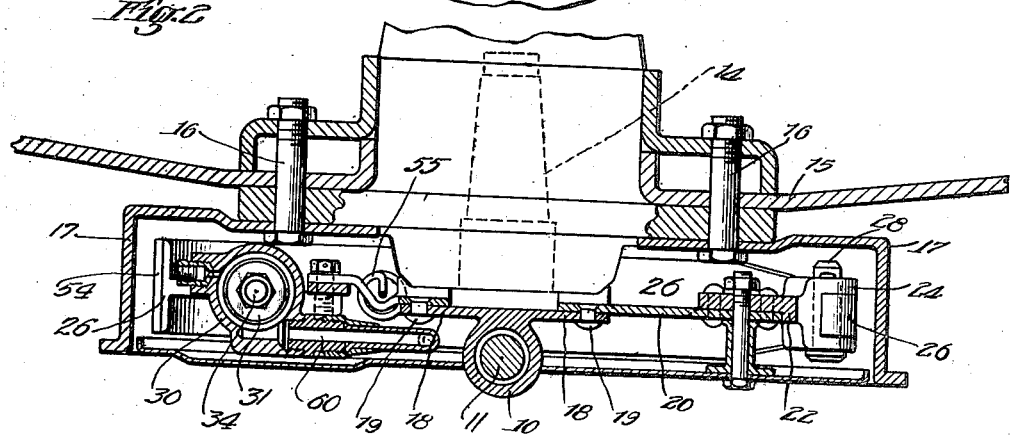
Inventor:
Malcolm Loughead
Williams Bradbury
McCabe & Pierce Attys

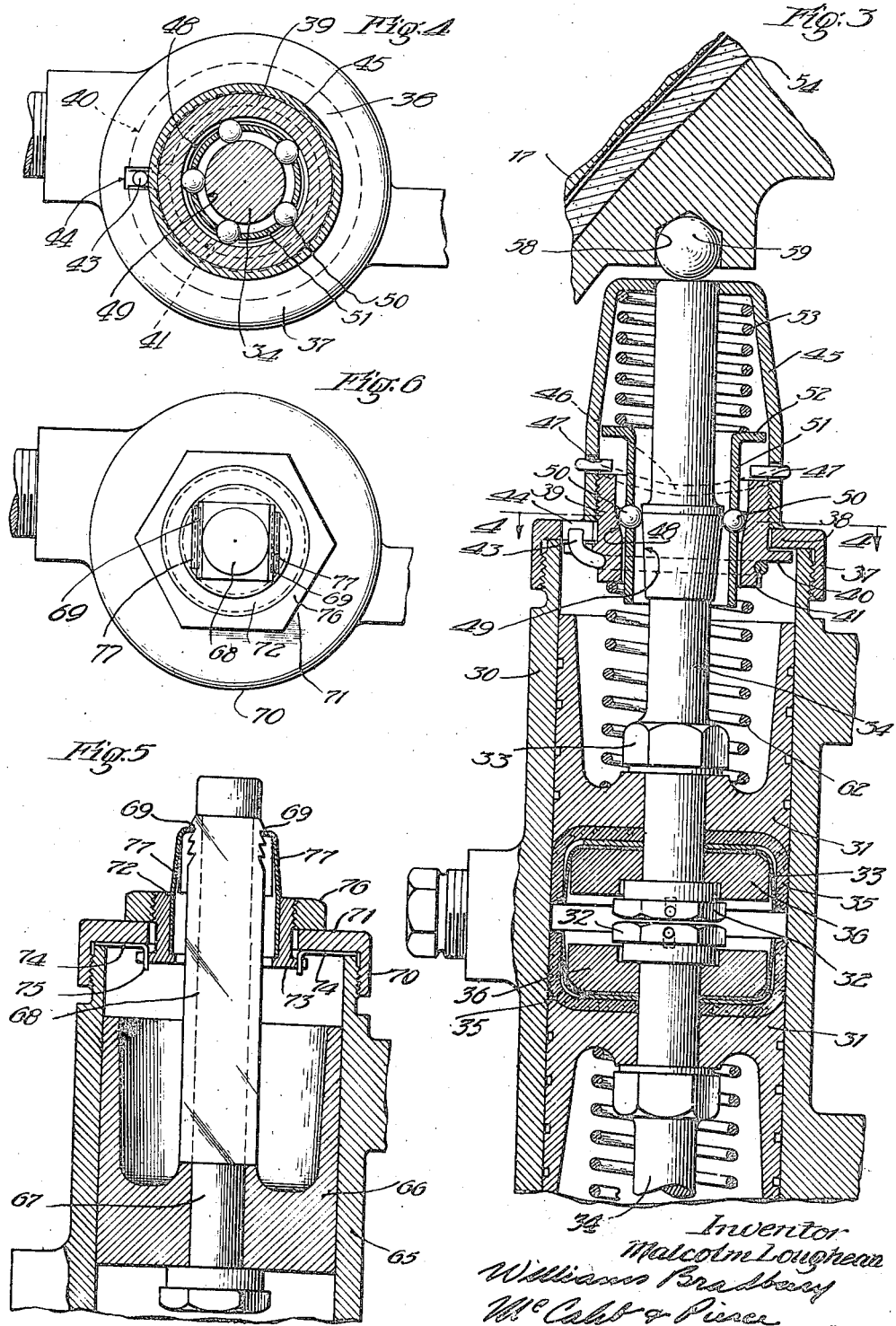

Patented Sept. 18, 1923.

1,468,600

UNITED STATES PATENT OFFICE.

MALCOLM LOUGHEAD, OF DETROIT, MICHIGAN, ASSIGNOR, BY MESNE ASSIGNMENTS, TO HYDRAULIC BRAKE COMPANY, OF LOS ANGELES, CALIFORNIA, A CORPORATION OF CALIFORNIA.

BRAKING APPARATUS.

Application filed July 10, 1922. Serial No. 574,043.

*To all whom it may concern:*

Be it known that I, MALCOLM LOUGHEAD, a citizen of the United States, and resident of Detroit, in the county of Wayne and State of Michigan, have invented a certain new and useful Improvement in Braking Apparatus, of which the following is a full, clear, concise, and exact description, reference being had to the accompanying drawings, forming a part of this specification.

This invention relates to braking apparatus, and is herein shown and described as applied to automobiles and particularly to braking apparatus of the fluid pressure operated type.

The principal feature of the invention resides in means for automatically compensating for the wear of braking surfaces so that the brake operating mechanism retracts through substantially the same distance after wear as when the braking surfaces are in their initial condition, that is, means are provided so that the brake band or shoe is retracted the same amount after it has become worn as when it is new.

Other features and advantages will appear from time to time as the description of the invention progresses.

In the drawings,

Figure 1 is a side elevation of the brake drum of an automobile with applicant's braking mechanism in position to co-operate therewith, certain parts being shown broken away;

Figure 2 is a section taken substantially on the line 2—2 of Figure 1;

Figure 3 is a longitudinal section through the brake operating cylinder, pistons, and mechanism associated therewith, part of one cylinder being shown broken away;

Figure 4 is a section substantially on the line 4—4 of Figure 3;

Figure 5 shows a modified form of the take-up mechanism, and

Figure 6 is a plan view of the arrangement shown in Figure 5.

Referring to the drawings just described, in which like reference characters indicate like parts in the several views, a steering knuckle 10 of the front wheel of the automobile is mounted in any suitable manner, such as upon the pivot pin 11, which in turn is supported between the separated ends 12 and 13 of the front axle yoke. The spindle 14, usually formed integrally with the steering knuckle 10, carries the wheel 15, which in turn carries the drum 17 preferably attached thereto by bolts 16. The bracket member 20 is rigidly secured to flanges 18 on the steering knuckle 10. On the right hand end of the bracket member 20, as viewed in Figure 1, is secured the bifurcated member 22 which terminates in bearings 23 and 24. These bearings respectively carry the pivot ends of brake shoes 25 and 26, the arrangement being such that the rotation of the shoes about the bearings 23 and 24 moves the shoes toward and away from the inner cylindrical face of the drum 17.

Secured to the left end of the bracket 20, as viewed in Figure 1, is a cylinder 30 within which a pair of operating pistons 31 are mounted. These operating pistons (see Fig. 3) are provided at their inner ends with cup washers 35, held in contact with the inner cylinder wall by means of spring metal cup expanders 33, held in place by metallic washers 36. The piston 31, cup leather 35, spring spreader 33 and washer 36 are secured to the piston stem 34 by means of a nut 32 threaded upon the end of the stem 34. The two pistons 31 operating in opposite ends of the cylinder 30 are identical, and therefore need not be separately described. Screw threaded on the end of the cylinder 30 is a collar 37 provided with an inwardly directed flange 38, projecting somewhat within the working surface of the cylinder 30. Within the cylinder 30 and flange 38 is a bushing 39, having an outwardly directed flange 40 of a diameter permitting it to lie within the cylinder 30, but to engage the inner side of the flange 38, thus limiting the outward movement of the bushing. A C-spring lock ring 41 engages the inner end of the bushing 39, and is provided with a projecting end 43 extending into a slot 44 in the collar 37, to prevent relative rotative movement of the bushing 39 and collar 37, but permitting a slight relative longitudinal movement of these parts. In screw threaded engagement with the upper end of the bushing 39 is a cup shaped cover and spring seat 45, having an opening in its top through which the end of the piston stem 34 projects. The bushing 39 is provided on its inner face with an inner conical surface 48, the included angle between the opposite sides of this cone being about 30°. The stem 34 has formed thereon opposite the conical surface 48 a cone shaped portion 49, the included angle between the opposite sides of which is about 4°. Positioned between the surface 48 and the cone 49 are a plurality of balls, wedges, or rollers 50 carried by a cage 51. The cage 51 is provided at its upper end with an outwardly directed flange 52, forming a seat for one end of the spring 53, the other end being seated in the top of the cup shaped cover 45. About one side of the cover 45 is a substantially semi-circular spring or wire 46, the inwardly directed ends 47 of which project through openings in the cover 45, and when the cover is rotated upon the screw threads of the bushing 39 these projecting ends 47 engage the under side of the flange 52 and lift the cage 51, permitting the stem 34 to be returned to its normal position in relation to the sleeve 39, this action being necessary when a new brake band is provided, as will be hereinafter more fully described.

The outer surfaces of the brake shoes 25 and 26 are provided with brake liners 54 which are normally retracted out of engagement with the brake drum 17 by means of tension springs 55, the opposite ends of which are secured in holes in the lugs 56 on the brake shoes. Near the free ends of the brake shoes 25 and 26 are provided bracket members 57, having openings 58 therein. These openings are each provided with a ball 59 adapted to be engaged by the end of the stem 34 when the pistons 31 are pressed outwardly by fluid pressure. Communicating with the part of the cylinder 30 between the pistons 31 is a tube 60 supported by the bracket member 61, this tube being extended to a suitable source of fluid pressure, not herein illustrated. This source of pressure may be of any desired character, wherein a reserve supply of fluid is provided for automatically supplying additional amounts of fluid to the system to compensate for leakage or for different piston positions as they may be assumed in the wear of brake linings. In the foregoing description, the term "brake shoe" is intended to include such other commonly known devices for the application of brake pressure, such as flexible brake bands and disks. The operation of the device shown in Figs. 1 to 4 is as follows: Assuming that the brake lining 54 is new, and of maximum thickness, as indicated in Fig. 3, and that the take-up mechanism is in a position to permit the stem 34 to be fully retracted, as indicated in Fig. 3, when fluid under pressure is forced through the tube 60 into the cylinder 30, between the adjacent ends of the pistons 31, the pistons move from their normal positions causing the stems 34 to forcibly engage the balls 59, thus operating to swing the free ends of the brake shoes 25 and 26 to force the brake linings 54 into firm engagement with the inner face of the drum 17.

As the brake lining 54 becomes worn, the brake shoes 25 and 26 will be moved further toward the brake drum 17 in order to cause the brake lining to effectively engage the drum. If no take-up means were provided, either automatic or otherwise, a greater movement of the pistons would be required in moving the shoes from their retracted positions to their working positions when the lining was worn than when the lining was new. By the use of my automatic take-up device, the parts are maintained in such relative positions that the same degree of piston movement is effective to set the brake linings into braking engagement with the drum when the lining is worn as is required for a single braking pressure when the lining is new. With this arrangement, the operator providing fluid pressure by the operation of a piston in the main fluid pressure cylinder moves the brake linings into contact with the brake drums through the same foot movement when the linings are worn as when the linings are new.

Assuming now that the lining 54 is materially worn: If fluid under pressure be forced into the cylinder 30, through the tube 60, the pistons 31 will move in opposite directions than before. After the pistons have moved a relatively short distance, the flange 40 on the bushing 39 will engage the inwardly directed flange 38 preventing the further movement of the bushing 39 in relation to the cylinder. Assuming now that the operator applies a slightly greater foot pressure than he has before applied, the stem 34 will continue to move until the brake has been completely set. When the stem 34 thus continues its movement, the space between the inner wall of the bushing 39 and the outer wall of the cone 49 will be slightly enlarged, because of the difference in angles of slope between the inner wall of the bushing 39 and the outer face of the cone 49. With this space between the cone and the bushing thus enlarged, the balls 50 are forced to a new position by means of the spring 53, so that when the brake is again retracted the stems 34 and pistons 31 will not move to the same positions which they occupied in retracted condition just prior to this particularly high brake setting compression. The base of the cover 45, where it now engages the outside of the flange 38, limits the retractile movement of the stem 34.

In the ordinary operation of setting the brakes, the movement of the stem 34 and piston 31 is limited to the clearance between the flange 40 of the bushing 39 and the flange 38 on the collar 37, but when, as above pointed out, the brake lining is slightly worn through continuous application of the brakes, and the operator applies a particularly high pressure, there will be a slight relative movement between the stem 34 and the bushing 39, which movement will not again occur until wear has again reduced the thickness of the brake lining, or until the operator has applied a still greater pressure to the fluid. The spring 62, positioned between the piston 31 and the bushing 39 serves merely to hold that bushing in firm contact with the balls 50 to prevent the shifting of the relative positions of the bushing 39 and the stem 34 through vibration, and insures the movement of the bushing 39 with the stem 34 when the brakes are being applied without in any way interfering with the automatic readjustment of positions between the stem and bushing as the brake lining wears. With the construction and operation just described in mind, it will be understood that the piston 31 and its stem 34 gradually move outwardly as the brake lining wears until, with the brake lining substantially all worn away, the end of the stem 34 will protrude an eighth of an inch or more beyond the top of the cover 45.

In Figures 5 and 6 is shown a modification of the take-up means in which a ratchet is employed. This mechanism operates in substantially the same manner as that shown in detail in Figure 3, except, due to the fact that a ratchet instead of the ball clutch is employed, the take-up occurs at definite intervals, instead of continuously.

Referring now to Figure 5, 65 indicates the cylinder and 66 the brake operating piston slidably mounted therein. Rigidly secured to the piston 66 is a stem 67. Mounted about the stem 67 is a sleeve 68 which has its opposite faces flattened and provided with ratchet teeth 69. In screw threaded engagement with the upper end of the cylinder 65 is a collar 70 having the inwardly directed flange 71. Positioned within the flange 71 is a collar 72 provided with a flange 73 which extends outwardly beneath the inwardly directed flange 71.

At 74 are shown spring locking arms, each of which has a downwardly directed inner end 75 positioned within an opening in the flange 73. The outer end of each of the spring arms 74 is clamped between the upper end of the cylinder 65 and the flange 71. These arms 74 operate to normally maintain the sleeve 72 in its lowermost position, and also act to prevent rotation of the sleeve 72 when the collar or nut 76 is screwed onto the upper end of the collar 72. Rigidly fixed to the collar 72 is a pair of pawl members 77 which are adapted to co-operate with the ratchet teeth 69 on the sleeve 68. The action of the device shown in detail in Figure 5, as previously stated, is substantially the same as that shown in Figure 3.

Assuming that the brake band has worn, if now the piston 66 be moved upwardly, after the initial movement the flange 73 will engage the flange 71 and prevent further movement of the sleeve 72 in relation to the cylinder 65. The stem 67, however, will continue to move and will carry with it the sleeve 68 with the ratchet teeth thereon. If the brake lining has worn sufficiently, the stem 67 will move in relation to the sleeve 72 a distance sufficient to permit the pawls 77 to engage back of the next ratchet teeth 69. If, however, the brake band has worn only a small amount, the pawls 77 will ride up on the inclined surfaces of the ratchet teeth 69 but will not move far enough to permit them to drop back of the next tooth in the series.

When it is desired to restore the parts to their normal position, as when the brake lining is replaced by a new one, the pawls 77 are retracted in any desired manner, as by the use of a pair of screw drivers, and the plunger 67 is permitted to move downwardly in relation to the sleeve 72.

While in the above description and in the drawings, certain specific details have been disclosed, it is to be understood that applicant contemplates many modifications in the particular arrangement of the various parts. It is, therefore, to be understood that the invention is to be limited merely by the scope of the appended claims.

Having thus described my invention, what I claim as new and desire to secure by Letters Patent of the United States is:

1. In braking mechanism, a pair of relatively movable friction members adapted to be forced into engagement with one another for braking purposes, an operating member for creating pressure between said relatively movable members, a stop for limiting the separation of said members, and an automatic take-up co-operating with said stop to compensate for wear between the pair of braking members so that their relative movement away from one another will be substantially the same after wear has occurred between them as in their initial condition.

2. An auotomatic adjusting device for taking up wear in braking mechanism comprising a movable wear member, a piston operatively connected therewith, mechanism movable with the piston for applying the brakes under ordinary conditions, said mechanism comprising parts movable relative to one another for taking up wear, said parts being shaped with a tapering space between them, a wedging member in said space, a spring tending to force said wedging member into the narrower part of said space, a second spring tending to move the relatively movable members in a direction to decrease the space between them, and a stop for one of said members limiting its movement in each direction, all functioning so that when one member moves relative to the other member in one direction, to compensate for wear, the wedging member prevents it from moving in a retrograde direction.

3. In braking mechanism, a brake drum, a brake shoe, a lining therefor, means for forcing said lining into engagement with said drum, a stop for limiting the retractile movement of said shoe and said means, a take-up associated with said stop, and means for automatically adjusting said take-up so as to permit a substantially equal retractile movement of said forcing means regardless of the condition of wear of said lining.

4. In braking mechanism, a brake drum, a wear member, a stem for forcing said wear member into engagement with said drum, a stop for limiting the retractile movement of said stem, a take-up associated with said stem, and means for automatically adjusting said take-up so as to permit a substantially equal retractile movement of said stem regardless of the condition of said wear member.

5. In braking mechanism for vehicles, a brake drum, a wear member, a stem for forcing said wear member into engagement with said drum, a bushing positioned about said stem, the inner surface of said bushing and the outer surface of said stem being formed to provide a tapered space therebetween, a wedging member positioned within said space, means tending to force said wedging member toward the restricted end of said space, and means for limiting the movement of said bushing in both directions.

6. In braking mechanism for vehicles, a brake drum, a brake shoe, a lining therefor, a stem for forcing said lining into engagement with said drum, a cylinder, a piston within said cylinder for operating said stem, a take-up associated with said stem, and means for automatically adjusting said take-up so as to permit a substantially equal retractile movement of said stem regardless of the condition of wear of said lining.

7. In braking mechanism, a rotating brake member, a relatively fixed wear member, a stem for actuating said wear member, a bushing positioned about said stem, means for limiting the movement of said bushing in both directions, and automatically adjustable means co-acting with said bushing and stem for preventing retrograde movement of said stem relative to said bushing.

8. In braking mechanism for vehicles, a brake drum, a brake shoe, a lining therefor, a cylinder, a piston movable within said cylinder, a tapered stem carried by said piston and having a part arranged to engage said shoe, a tapered abutment positioned adjacent said stem, means for limiting the movement of said abutment in both directions, and a take-up clutch co-operatively joining said tapered abutment and tapered stem so as to permit movement of said stem past said abutment in one direction, but to prevent movement of the stem past said abutment in the opposite direction.

9. In braking mechanism for vehicles, a brake drum, a brake shoe, a lining therefor, a cylinder, a piston within said cylinder, a stem carried by said piston and arranged to engage said brake shoe, a bushing positioned about said stem, means for limiting the backward and forward movement of said bushing, the inner surface of said bushing and the outer surface of said stem being formed to provide a tapering space therebetween, a series of balls within said space, a ball cage engaging said balls, and a spring engaging said ball cage and tending to force said balls toward the restricted end of said space.

10. In braking mechanism, a brake drum, a brake shoe, a cylinder, a piston within said cylinder, a stem carried by said piston and arranged to engage said brake shoe, a bushing positioned about said stem, means for limiting the backward and forward movement of said bushing, the inner surface of said bushing and the outer surface of said stem being formed to provide a tapering space therebetween, a ball cage within said space, a series of balls carried by said cage and arranged to engage the adjacent surfaces of said bushing and stem, a spring engaging said ball cage and tending to force said balls toward the restricted end of said space, and a spring engaging said bushing and tending to move it relative to said stem, said balls operating to prevent such relative movement.

11. In braking mechanism for vehicles, a brake drum, a brake shoe, a cylinder, a piston within said cylinder, a stem carried by said piston and arranged to engage said shoe, a bushing surrounding said stem, said bushing and stem being formed to provide a space therebetween tapering toward said piston, a ball cage within said space, a plurality of balls carried by said cage, a spring engaging said cage and tending to force said balls toward the restricted end of said space, and a spring engaging said bushing and tending to force it in the opposite direction.

In witness whereof, I hereunto subscribe my name this 14th day of June, 1922.

MALCOLM LOUGHEAD.

Witnesses:
EMILE J. BOURGEOIS,
DAGMAR PETERSON.